United States Patent
Zheng et al.

(10) Patent No.: US 11,693,392 B2
(45) Date of Patent: Jul. 4, 2023

(54) SYSTEM FOR MANUFACTURING DISPATCHING USING DEEP REINFORCEMENT AND TRANSFER LEARNING

(71) Applicant: Hitachi, Ltd., Tokyo (JP)

(72) Inventors: Shuai Zheng, San Jose, CA (US); Chetan Gupta, San Mateo, CA (US); Susumu Serita, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 1150 days.

(21) Appl. No.: 16/262,778

(22) Filed: Jan. 30, 2019

(65) Prior Publication Data

US 2020/0241511 A1    Jul. 30, 2020

(51) Int. Cl.
*G06N 3/04* (2023.01)
*G06N 3/08* (2023.01)
*G05B 19/418* (2006.01)

(52) U.S. Cl.
CPC ......... *G05B 19/41865* (2013.01); *G06N 3/04* (2013.01); *G06N 3/08* (2013.01); *G05B 2219/32335* (2013.01); *G05B 2219/34379* (2013.01); *G05B 2219/40499* (2013.01)

(58) Field of Classification Search
CPC .... G05B 19/41865; G05B 2219/32335; G05B 2219/34379; G05B 2219/40499; G06N 3/04; G06N 3/08
See application file for complete search history.

(56) References Cited

U.S. PATENT DOCUMENTS

2017/0243135 A1    8/2017    Ooba et al.
2018/0129974 A1    5/2018    Giering et al.

FOREIGN PATENT DOCUMENTS

CN    108595267 A    9/2018

OTHER PUBLICATIONS

Waschneck, B., Reichstaller, A., Belzner, L., Altenmüller, T., Bauernhansl, T., Knapp, A., & Kyek, A. (Apr. 2018). Deep reinforcement learning for semiconductor production scheduling. In 2018 29th annual SEMI advanced semiconductor manufacturing conference (ASMC) (pp. 301-306). IEEE. (Year: 2018).*

Wei, Y., & Zhao, M. (Dec. 2004). Composite rules selection using reinforcement learning for dynamic job-shop scheduling. In IEEE Conference on Robotics, Automation and Mechatronics, 2004. (vol. 2, pp. 1083-1088). IEEE. (Year: 2004).*

(Continued)

*Primary Examiner* — Ying Yu Chen
*Assistant Examiner* — Lokesha G Patel
(74) *Attorney, Agent, or Firm* — Procopio, Cory, Hargreaves & Savitch LLP

(57) ABSTRACT

Example implementations described herein are directed to a system for manufacturing dispatching using reinforcement learning and transfer learning. The systems and methods described herein can be deployed in factories for manufacturing dispatching for reducing job-due related costs. In particular, example implementations described herein can be used to reduce massive data collection and reduce model training time, which can eventually improve dispatching efficiency and reduce factory cost.

15 Claims, 7 Drawing Sheets

(56) References Cited

OTHER PUBLICATIONS

Taylor, M. E., Whiteson, S., & Stone, P. (May 2007). Transfer via inter-task mappings in policy search reinforcement learning. In Proceedings of the 6th international joint conference on Autonomous agents and multiagent systems (pp. 1-8). (Year: 2007).*

Wang, Y. C., & Usher, J. M. (2004). Learning policies for single machine job dispatching. Robotics and Computer-Integrated Manufacturing, 20(6), 553-562. (Year: 2004).*

Wang, J., Ma, Y., Zhang, L., Gao, R. X., & Wu, D. (2018). Deep learning for smart manufacturing: Methods and applications. Journal of manufacturing systems, 48, 144-156. (Year: 2018).*

Extended European Search Report for related European Application No. 20154554.8 dated Apr. 8, 2020; 8 pages.

Priore, P. et al. "Dynamic Scheduling of Manufacturing Systems Using Machine Learning: An Updated Review" Artificial Intelligence for Engineering Design, Analysis and Manufacturing, Jan. 20, 2014, pp. 83-97, vol. 28, No. 1.

Heger, J. et al. "Improving Production Scheduling with Machine Learning" Jan. 31, 2012, pp. 43-48.

Chen, X. et al. "Rule Driven Multi-Objective Dynamic Scheduling by Data Envelopment Analysis and Reinforcement Learning" International Conference on Automation and Logistics (ICAL), IEEE, Aug. 16-20, 2010, pp. 396-401.

Miao, H et al. "Resource Management with Deep Reinforcement Learning" Proceedings of the 15th ACM Workshop an Hot Topics in Networks, Nov. 9, 2016, pp. 50-56, New York, NY.

Mao, H., et al., Resource Management with Deep Reinforcement Learning, Proceedings of the 15th ACM Workshop on Hot Topics in Networks, Hotnets '16, Nov. 9, 2016, pp. 50-56.

Martinez Jimenez, Y., A Generic Multi-Agent Reinforcement Learning Approach for Scheduling Problems, Dissertation, Dec. 31, 2012, [online] retrieved Feb. 26, 2021, URL:https://ai.vub.ac.be/sites/default/files/phd-yailen.pdf.

Riedmiller, S., et al., A Neural Reinforcement Learning Approach to Learn Local Dispatching Policies in Production Scheduling, IJCAI'99: Proceedings of the 16th International Joint Conference on Artificial Intelligence in Stockholm, Sweden, vol. 2, Dec. 31, 1999, pp. 764-769, [online] URL: https://www.ijcai.org/Proceedings/99-2/Papers/016.pdf.

Communication Pursuant to Article 94(3) EPC for related EP App No. 20154554.8 dated Mar. 10, 2021, 20 pgs.

Blackstone, J. et al. "A state-of-the-art survey of dispatching rules for manufacturing job shop operations" The International Journal of Production Research; 1982, 20 pages; vol. 20, issue 1; Taylor & Francis, London, UK.

Mao, H. et al. "Resource Management with Deep Reinforcement Learning" In Proceedings of the 15th ACM Workshop on Hot Topics in Networks; Nov. 9-10, 2016; 7 pages; Atlanta, GA, USA.

Grandl, R. et al. "Multi-Resource Packing for Cluster Schedulers" ACM SIGCOMM Computer Communication Review; Aug. 17-22, 2014; 12 pages; Chicago, IL, USA.

Zhang, W. et al. "A Reinforcement Learning Approach to Job-shop Scheduling" International Joint Conferences on Artificial Intelligence, Aug. 20-25, 1995; 7 pages; vol. 95; Montreal, Quebec, Canada.

Zheng, S. et al. "Harmonic Mean Linear Discriminant Analysis" In IEEE Transactions on Knowledge and Data Engineering (TKDE), 2018; 12 pages.

Zheng, S. et al. "Long Short-Term Memory Network for Remaining Useful Life Estimation" IEEE International Conference on Prognostics and Health Management (ICPHM), Jun. 2017; 8 pages.

Zheng, S. et al. "A Closed Form Solution to Multi-View Low-Rank Regression" Proceedings of the Twenty-Ninth AAAI Conference on Artificial Intelligence, Jan. 2015; 7 pages.

Zheng, S. et al. "Kernel Alignment Inspired Linear Discriminant Analysis" In Joint European Conference on Machine Learning and Knowledge Discovery in Databases, Sep. 2014; 16 pages; Springer, Berlin, Heidelberg.

Ammar, H. B., et al. "Unsupervised Cross-Domain Transfer in Policy Gradient Reinforcement Learning via Manifold Alignment" Proceedings of the Twenty-Ninth AAAI Conference on Artificial Intelligence, Jan. 2015; 7 pages.

Wang, C. et al. "Manifold Alignment without Correspondence" Proceedings of the Twenty-First International Joint Conference on Artificial Intelligence, Jul. 2009; 6 pages; vol. 2, Issue 3.

Joshi, G. et al. "Cross-Domain Transfer in Reinforcement Learning using Target Apprentice" International Conference on Robotics and Automation, May 21-25, 2018; 8 pages; Brisbane, Australia.

* cited by examiner

SYSTEM FOR MANUFACTURING DISPATCHING USING DEEP REINFORCEMENT AND TRANSFER LEARNING

BACKGROUND

Field

The present disclosure is generally related to manufacturing, and more specifically to manufacturing dispatching through deep reinforcement and transfer learning.

Related Art

In the manufacturing industry, a factory receives production job orders from customers, starts processing job orders, and finally delivers products to customers. There are some costs in this process that are associated with the sequence of processing those jobs. Each job comes with a due time. Past-due costs are the costs incurred when a job cannot be delivered on time. Inventory costs are the storage costs incurred when the job is finished before the due time, resulting in inventory remaining in the factory. Thus, manufacturing managers want on-time delivery and minimum past-due costs and inventory costs. However, achieving these goals requires an efficient dispatching rule. A dispatching rule is used to select the next job to be processed from a set of jobs awaiting service.

In the related art, the dispatching problem is known to be difficult to resolve. Firstly, real problems tend to be large (e.g., involving hundreds of jobs, tens of machines and dozens of processing stages), and finding the optimal dispatching rule for a real-world problem is NP-hard. For example, given n jobs queued at a processing machine, there are n! ways to sequence those jobs. Secondly, decisions at some machines might influence the optimal sequence of jobs at other machines, and decision at any time might influence the optimal decisions later. Thirdly, optimal dispatching rule varies from factory to factory. In fact, no dispatching rule has been shown to consistently produce lower total costs than all other rules under a variety of factory configurations and operating conditions. Taking past-due costs and inventory costs into consideration adds another level of complexity.

In the related art, there are implementations involving using reinforcement learning for computer job scheduling. However, such related art implementations do not consider slack time information and cannot minimize past-due cost and inventory cost. Some related art implementations utilize a packing technique to increase resource utilization. Some related art implementations utilize reinforcement learning for job scheduling, but there is no state representation defined, and their objective cannot minimize past-due cost and inventory cost.

In advanced manufacturing, as more and more Internet of Things (IoT) applications are adopted and machine sensor data and operating parameter data are collected, deep learning models outperform traditional methods in predictive maintenance and failure predictions. Data-intensive deep learning models have been shown successful in decision-making health care, manufacturing, financial modeling and marketing.

Manifold alignment has been applied to cross-domain transfer in games. Manifold alignment finds a shared space for data from two different domains and preserves the neighborhood relationship of data in this shared space. Such related art implementations are very similar to some subspace learning approaches.

SUMMARY

Example implementations described herein are directed to a deep reinforcement and transfer learning based manufacturing dispatching system. Using deep reinforcement learning, this invention formulates manufacturing dispatching process using a reinforcement learning framework. Using transfer learning, example implementations design algorithms to transfer optimal dispatching policy from one factory to another factory.

Example implementations involve aspects such as the design of manufacturing dispatching systems using reinforcement learning for minimizing job-due related cost; state representations for reinforcement learning, including both machine state and job queue state, job processing information and slack time information; new reward functions for reinforcement learning, including lateness and tardiness; and algorithms to transfer dispatching policy, recover dispatching policy.

Example implementations involve the design of a deep reinforcement and transfer learning based manufacturing dispatching system. Through use of the example implementations described herein, job-due related costs can be minimized through using reinforcement learning, and over any time step (e.g., short to long periods of time). Example implementations can also be applied in dynamic manufacturing environments where job orders arrive randomly, and can also be used to transfer optimal dispatching policy from one factory to another factory.

Aspects of the present disclosure include a method, which can involve generating a trained deep learning model configured to provide instructions to a factory process of a factory, which can involve obtaining parameters from the factory process to derive a state of the factory process, such as slack time; determining instructions for the factory process based on applying a deep learning model on the factory process trained against lateness and tardiness; providing instructions to the factory process for execution at the factory; obtaining state transitions of the state from updated parameters of the factory process including completion time as received from the factory; and calculating a reward for the instructions provided to update the deep learning model, the reward based on deriving lateness and tardiness from predetermined job due and the completion time.

Aspects of the present disclosure include a non-transitory computer readable medium, storing instructions for executing a process, which can involve generating a trained deep learning model configured to provide instructions to a factory process of a factory, which can involve obtaining parameters from the factory process to derive a state of the factory process, such as slack time; determining instructions for the factory process based on applying a deep learning model on the factory process trained against lateness and tardiness; providing instructions to the factory process for execution at the factory; obtaining state transitions of the state from updated parameters of the factory process including completion time as received from the factory; and calculating a reward for the instructions provided to update the deep learning model, the reward based on deriving lateness and tardiness from predetermined job due and the completion time.

Aspects of the present disclosure include a system, which can involve means for generating a trained deep learning model configured to provide instructions to a factory process of a factory, including means for obtaining parameters from the factory process to derive a state of the factory process, such as slack time; means for determining instructions for the factory process based on applying a deep learning model on the factory process trained against lateness and tardiness; means for providing instructions to the factory process for execution at the factory; means for obtaining state transitions of the state from updated parameters of the factory process including completion time as received from the factory; and means for calculating a reward for the instructions provided to update the deep learning model, the reward based on deriving lateness and tardiness from predetermined job due and the completion time.

Aspects of the present disclosure can further include an apparatus configured to control a factory process of a factory through instructions, the apparatus involving a memory configured to store a trained deep learning model; and a processor, configured to generate the trained deep learning model configured to provide the instructions, by obtaining parameters from the factory process to derive a state of the factory process, such as slack time; determining instructions for the factory process based on applying a deep learning model on the factory process trained against lateness and tardiness; providing instructions to the factory process for execution at the factory; obtain state transitions of the state from updated parameters of the factory process including completion time as received from the factory; and calculate a reward for the instructions provided to update the deep learning model, the reward based on deriving lateness and tardiness from predetermined job due and the completion time.

DETAILED DESCRIPTION

Figure 1:
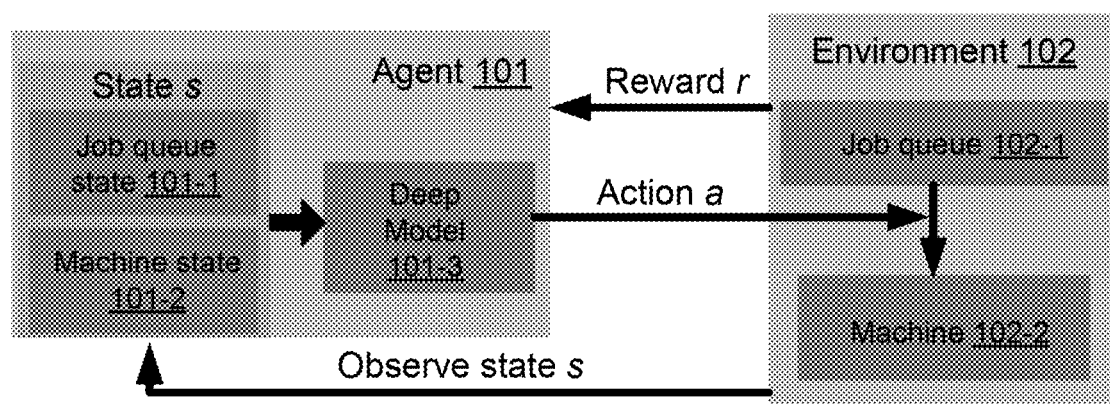
FIG. 1 illustrates an example system flow in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve two sections: deep reinforcement learning based manufacturing dispatching, and dispatching policy transfer using transfer learning.

FIG. 1 illustrates an example system flow in accordance with an example implementation. As illustrated in FIG. 1, the environment 102 involves a job queue block 102-1 and processing machine block 102-2. Machine block 102-2 can include one processing unit or multiple processing units. There are many jobs waiting in job queue block 102-1 to be processed. Agent 101 is a reinforcement learning software package. At each time step, reinforcement learning agent 101 observes a state s, which includes job queue state 101-1 and machine state 101-2, then outputs a probability vector with respect to each action using a deep learning model 101-3 as a function approximator. The action of reinforcement learning agent 101 is the index of a job waiting in job queue 102-1. The agent 101 will then select action a with the highest probability and allocate the a-th job to the machine block 102-2. The agent also receives a reward r from the environment for this action.

Job queue block 102-1 can be further divided into two parts: job slot and backlog slot. Assume there are n job slots and m backlog slots. Each job has a processing time (job length) p and a due time d. Jobs arrive randomly. When a job arrives, it will be placed in one of the n job slots randomly. If the job slots are full, the job will be placed on backlog slots. When there is space in the job slots, the jobs in backlog will be moved to job slot in the order of arrival. If a job is placed on a job slot, its p and d can be seen by the dispatcher and it can be selected by the dispatcher. For jobs placed on backlog slots, only the job count can be seen and those jobs cannot be selected by the dispatcher. Let $t_{curr}$ indicate current time. Related art implementations cannot handle slack time, and their optimization objective function cannot minimize job-due related costs. Slack time slack of a job is defined as:

$$slack = d - t_{curr} - p$$

If slack>0, it means that if this job is started now, it will be completed before its due time; if slack<0, it means that it will be completed after its due time. The system elements of state space, action space, reward, training are explained as follows.

State Space.

State space includes both states of the machine and the job queue. At any time step, consider the states T time steps ahead and use a Z length array to represent the slack time. Example implementations utilize a 2-D matrix to represent the machine state and the job queue state.

Figure 2:
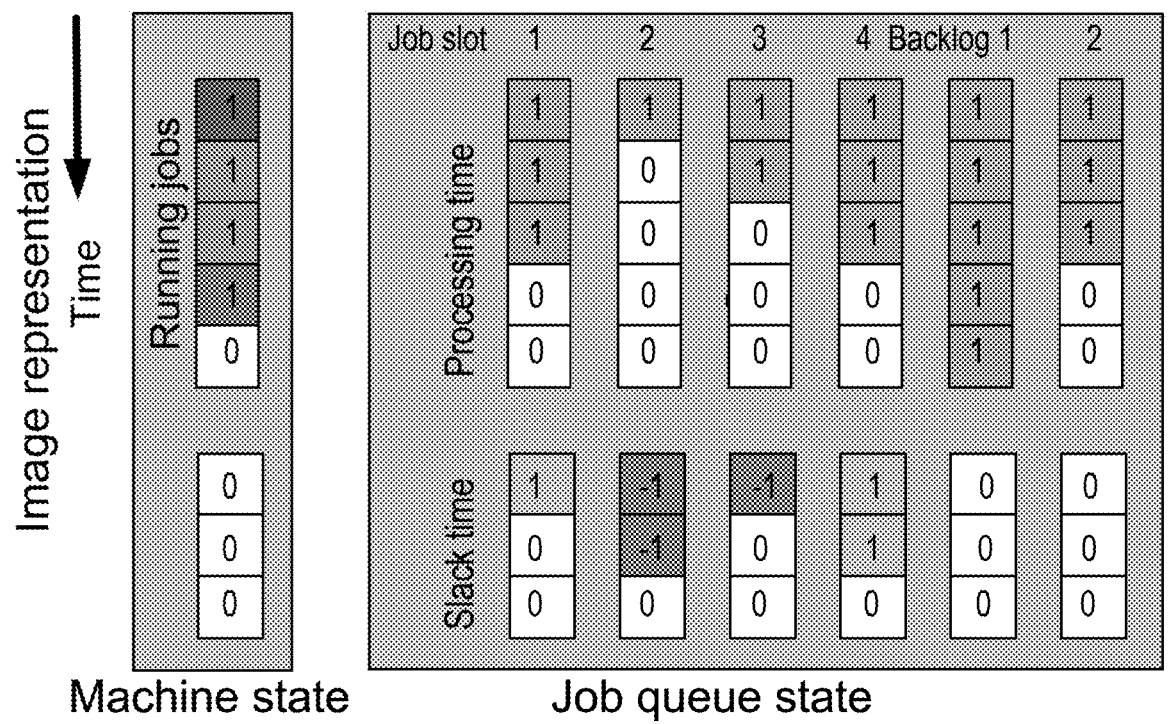
FIG. 2 illustrates a representation of the machine state and the job queue state, in accordance with an example implementation.

FIG. 2 illustrates a representation of the machine state and the job queue state, in accordance with an example implementation. Value 1 in machine state means that the machine at that time step has been allocated, and value 0 means that the machine will be idle. As time proceeds through each time step, the T-length array shifts up by one unit and a new 0 value is appended to the bottom. The Job queue state involves n job slots and m backlog. Each job slot is represented using two arrays: processing time and slack time. The processing time array is represented using a T length array, with the number of 1s indicating job length p. The slack time is represented using a Z length array, where 1 means positive slack and −1 means negative slack. The sum of slack time array represents job slack. Backlog state is represented by several T-length arrays, with a total of m slots, where each slot represents a job. In FIG. 2, the backlog is represented using two 5-length arrays and there are 8 jobs in backlog. The 0s under machine state and backlog do not represent slack time and are padded to make the state as a complete 2-D matrix.

Reward.

Dispatching performance can be evaluated in terms of lateness L, tardiness TA. Let the completion time of a job be c. Lateness is the absolute difference between job due time and job completion time:

$$L=|c-d|,$$

where $L \geq 0$. Tardiness only considers the lateness when the job is late. Thus, tardiness TA is defined as:

$$TA=\max(c-d,0),$$

where $TA \geq 0$. The objective of dispatching policy is to minimize the average lateness and tardiness. Thus, example implementations design the reward at each time step with respect to lateness and tardiness as:

$$r_L = -\sum_{j \in P} \frac{L_j}{p_j},$$

$$r_{TA} = -\sum_{j \in P} \frac{TA_j}{p_j},$$

where P is set of jobs that are currently being processed by the machine. Summation of $r_L$ and $r_{TA}$ over all time steps for the running jobs equals to the total lateness and tardiness.

Training. The total discounted reward can be maximized using standard reinforcement learning algorithms, such as policy gradient, A3C, or any other method in accordance with the desired implementation.

In example implementations, there are two environments: the source environment and the target environment. In the source environment, the optimal dispatching policy is already known. As will be described herein, example implementations determine an optimal dispatching policy in a target environment by using the source environment optimal dispatching policy.

Given some random source states $s_0^x, s_1^x, \ldots$, random target states $s_0^y, s_1^y, \ldots$, manifold alignment finds two projections $\alpha, \beta$ by minimizing the objective function:

$$C(\alpha, \beta) = \mu \sum_{i,j} (\alpha^T s_i^x - \beta^T s_j^y)^2 W^{i,j} + $$
$$0.5 \sum_{i,j} (\alpha^T s_i^x - \alpha^T s_j^x)^2 W_x^{i,j} + 0.5 \sum_{i,j} (\beta^T s_i^y - \beta^T s_j^y)^2 W_y^{i,j}$$

where random states are reshaped into column vector. $W_x$, $W_y$ are similarity matrices for source environment and target environment respectively. W is the similarity matrix between source and target environment, and can be computed using a KNN local geometry matrix. Solving this equation can be formulated into a generalized eigenvalue problem.

After minimizing $C(\alpha,\beta)$, there are two projections $\alpha,\beta$. The state projection from source state to target state can then be given:

$$\chi = \beta^{T\dagger} \alpha^T,$$

where $\beta^{T\dagger}$ is the matrix pseudo inverse of $\beta^T$. A source environment state $s^x$ can then be transferred to a target environment state $s^y$ using equation:

$$s^y = \chi s^x$$

Figure 3:
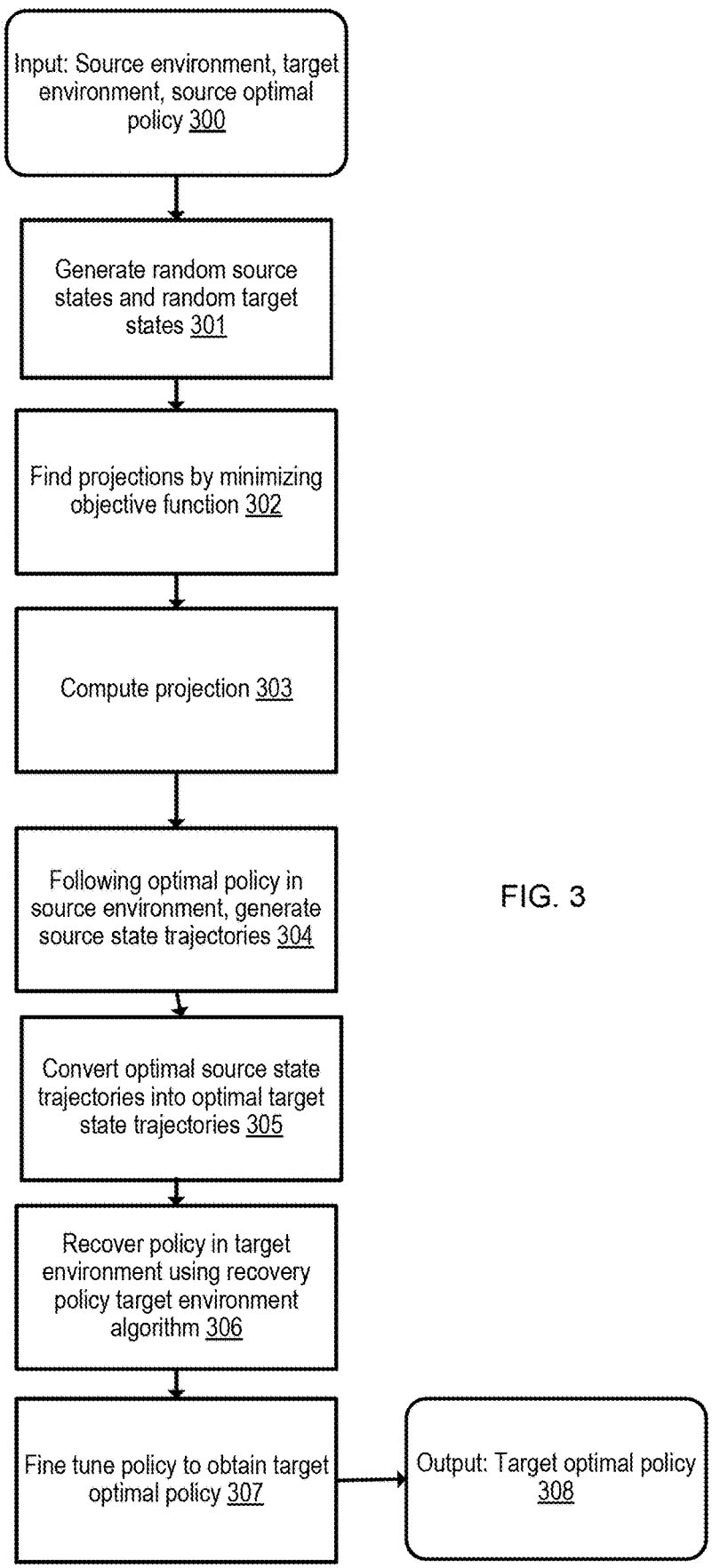
FIG. 3 illustrates an example flow for a policy transfer learning algorithm, in accordance with an example implementation.

FIG. 3 illustrates an example flow for a policy transfer learning algorithm, in accordance with an example implementation. FIG. 3 illustrates the policy transfer learning in detail. The input 300 of the flow includes both the source environment and the target environment, as well as the source optimal policy. The output 308 is the target optimal policy. At 301, the flow generates random source states $s_0^x$, $s_1^x, \ldots$ for the source environment, and random target states $s_0^y, s_1^y, \ldots$ for the target environment. At 302, using the random states of step 1, the two projections $\alpha, \beta$ can be computed by minimizing objective function $C(\alpha,\beta)$.

At 303, the projection $\chi$ between the source environment and the target environment is computed by using equation $\chi = \beta^{T\dagger} \alpha^T$.

At 304, by following the optimal policy in the source environment, the flow generates source state trajectories $\{s_{00}^x, s_{01}^x, \ldots\}, \{s_{10}^y, s_{11}^y, \ldots\}$. Note here that $\{s_{00}^x, s_{01}^x, \ldots\}$ indicates an optimal trajectory, which means the order is fixed and one state follows another state. At 305, the flow converts optimal source state trajectories $\{s_{00}^x, s_{01}^x, \ldots\}, \{s_{10}^x, s_{11}^x, \ldots\}$ into optimal target state trajectories $\{s_{00}^y, s_{01}^y, \ldots\}, \{s_{10}^y, s_{11}^y, \ldots\}$ using the projection $\chi$ obtained at 303. At 306, the initial policy is recovered by using recovery policy target environment algorithm as outlined in FIG. 4. At 307, the algorithm conducts fine-tuning of the initial policy and outputs the optimal policy in target environment at 308.

Figure 4:
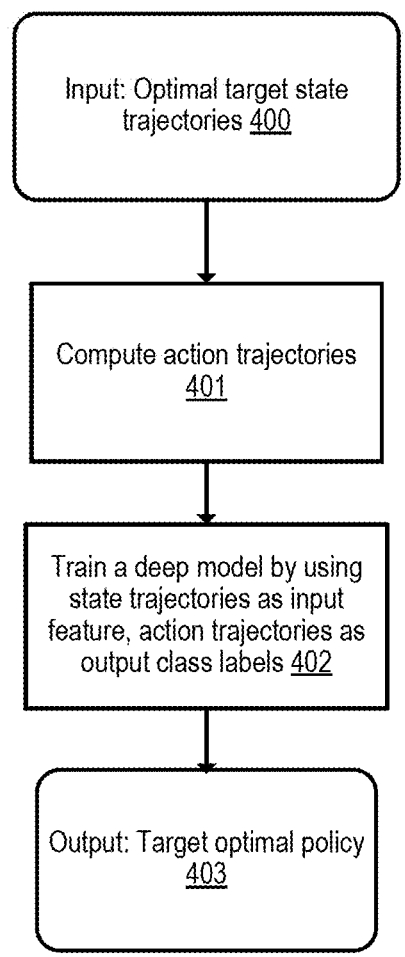
FIG. 4 illustrates a flow for a recover target environment policy algorithm, in accordance with an example implementation.

FIG. 4 illustrates a flow for a recover target environment policy algorithm, in accordance with an example implementation. Specifically, FIG. 4 illustrates an algorithm that recovers the target environment policy given the optimal target state trajectories $\{s_{00}^y, s_{01}^y, \ldots\}, \{s_{10}^y, s_{11}^y, \ldots\}, \ldots$. A policy is a map from state to action. In the dispatching problem, the action is to select a job from a set of jobs, or the index of a job slot. Given a state, example implementations can perform a action a and get the next state by setting the a-th job slot column as 0s. Given a state trajectory $\{s_0^y, s_1^y, \ldots\}$, example implementations operate on the assumption that states change from one state to the next state. To find the action trajectory, $\{a_0^y, a_1^y, \ldots\}$, the following equation is utilized:

$$a_{t-1}^y = \arg\min_a \| \widetilde{s_t^y(a)} \, s_t^y \|,$$

where $a_{t-1}^y$ is the action for the state change from $s_{t-1}^y$ to $s_t^y$. $\widetilde{s_t^y(a)}$ can be computed by setting the a-th job slot column of $s_{t-1}^y$ as 0s. $\|\cdot\|$ indicates Euclidean norm. After getting action trajectories $\{a_{00}^y, a_{01}^y, \ldots\}, \{a_{10}^y, a_{11}^y, \ldots\}, \ldots$ at 401, the flow proceeds to 402 to train a deep model by using state trajectories as input feature, action trajectories as output class labels. At 403, the target optimal policy is output.

Figure 5:
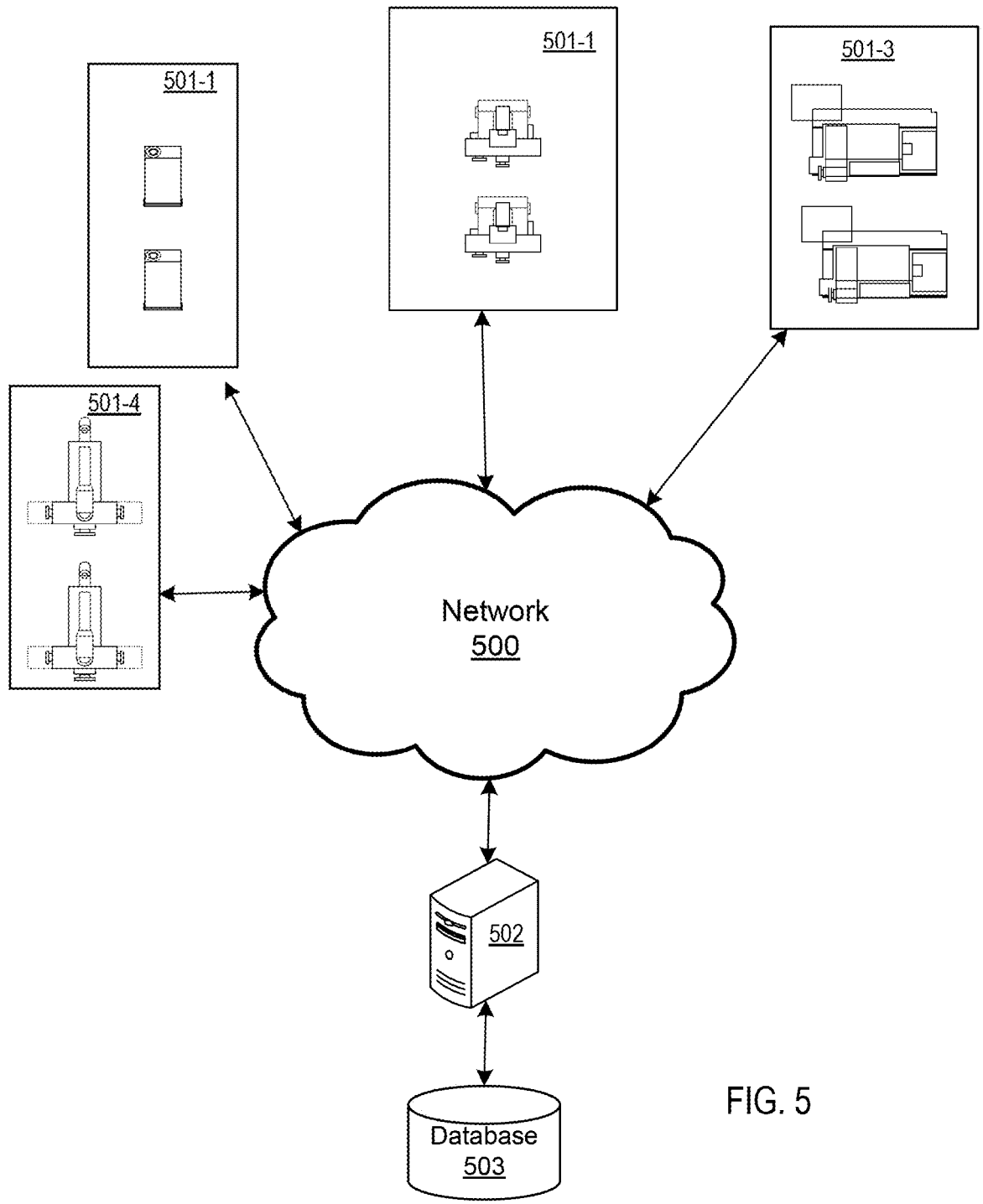
FIG. 5 illustrates a plurality of systems and a management apparatus, in accordance with an example implementation.

FIG. 5 illustrates a plurality of systems and a management apparatus, in accordance with an example implementation. One or more systems 501-1, 501-2, 501-3, and 501-4 are communicatively coupled to a network 500 which is connected to a management apparatus 502. The management apparatus 502 manages a database 503, which contains data feedback aggregated from the systems in the network 500.

Figure 6:
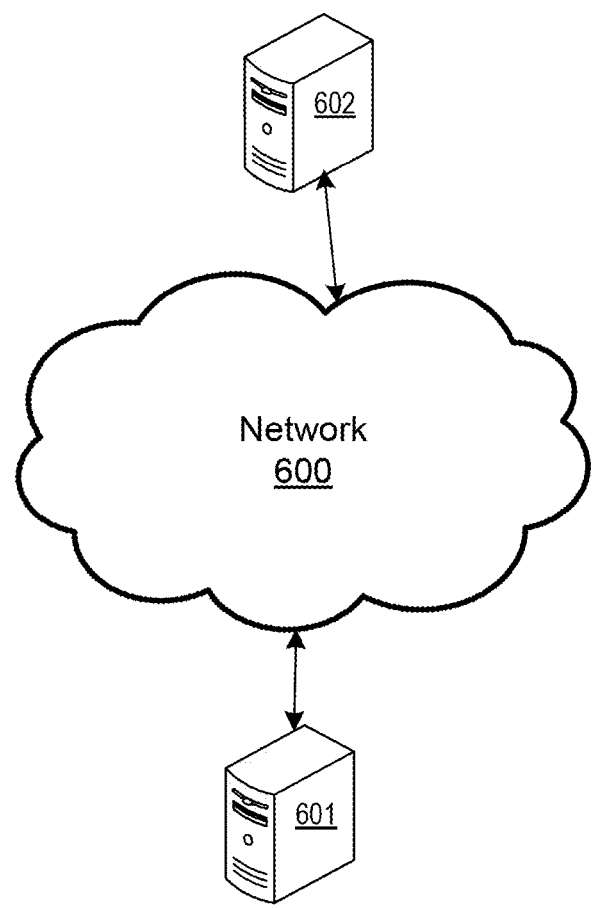
FIG. 6 illustrates an environment for conducting a transfer between a source environment and a target environment, in accordance with an example implementation.

In alternate example implementations, the data feedback from the systems 501-1, 501-2, 501-3, and 501-4 can be aggregated to a central repository or central database such as proprietary databases that aggregate data from systems such as enterprise resource planning systems, and the management apparatus 502 can access or retrieve the data from the central repository or central database. Such systems can include apparatuses to be operated on by an operator for manufacturing or other processes, such as lathes, presses, mills, grinders, and so on, as well as mobile apparatuses such as forklifts, cranes, trucks as well as any other apparatuses that are to be operated on by an operator for the purposes of a manufacturing, factory, or other process. In example implementations described herein, there can be multiple instances of the system illustrated in FIG. 5 to represent multiple different factories. In example implementations, management apparatus 502 can be FIG. 6 illustrates an environment for conducting a transfer between a source environment and a target environment, in accordance with an example implementation. Specifically, the source environment 601 and the target environment 602 interact via network 600. The transfer of the optimal policy is conducted through the execution of FIG. 3 and FIG. 4 and can be conducted by either the source environment 601 or the target environment 602 depending on the desired implementation. In an example implementation, source environment 601 or another third party apparatus that manages source environment 601 executes the flow of FIG. 3 and FIG. 4 to generate the trained deep learning model and then provides the trained deep learning model to target environment 602. In another example implementation, source environment 601 or another third party apparatus provides the input of FIG. 3 to the target environment 602, and the target environment executes the flow of FIG. 3 and FIG. 4 to determine the optimal target policy and trained machine learning model. Through the implementations of FIGS. 3, 4 and 6, a particular optimized factory process can be translated and provided to other factories invoking similar functions, thereby allowing for the programming of the factory controller in other factories to execute the same optimizations.

Figure 7:
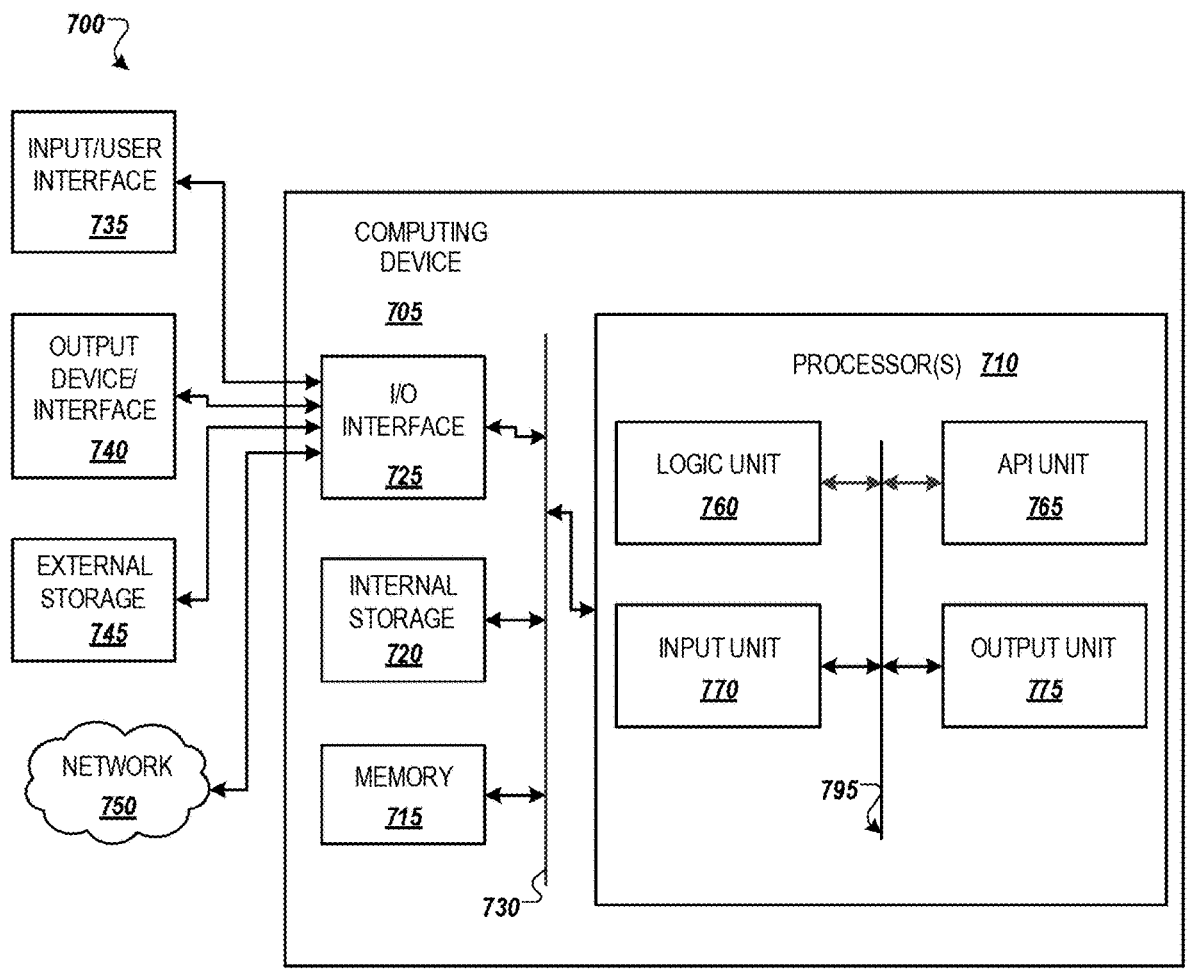
FIG. 7 illustrates an example computing environment with an example computer device suitable for use in example implementations.

FIG. 7 illustrates an example computing environment with an example computer device suitable for use in example implementations, such as for management apparatus 502/601/602. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705. In example implementations involving a touch screen display, a television display, or any other form of display, the display is configured to provide a user interface.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Memory 715 may be configured to store or manage algorithms to be executed by processor(s) 710 as described in the flow, for example, of FIGS. 3 and 4 and can be configured to store the optimal policy in the form of the trained deep learning algorithm. The example implementations as described herein may be conducted singularly, or in any combination of each other according to the desired implementation and are not limited to a particular example implementation.

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of physical processors or central processing units (CPU) that is configured to execute instructions loaded from Memory 715.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Processor(s) 710 can be configured to generate a trained deep learning model configured to provide instructions to a factory process of a factory, by obtaining parameters from the factory process to derive a state of the factory process, the parameters comprising slack time; determining instructions for the factory process based on applying a deep learning model on the factory process trained against lateness and tardiness; providing instructions to the factory process for execution at the factory; obtaining state transitions of the state from updated parameters of the factory process including completion time as received from the factory; and calculating a reward for the instructions provided to update the deep learning model, the reward based on deriving lateness and tardiness from predetermined job due and the completion time as shown in FIG. 1.

Processor(s) 710 can be configured to execute the steps of a) determining instructions for the factory process, b) providing instructions to the factory process for execution at the factory, c) obtaining state transitions from updated parameters of the factory process as received from the factory, and d) calculating a reward for the instructions provided to update the deep learning model in order from steps a) to d) and repeated until the deep learning model converges as the trained deep learning model as illustrated in FIG. 1. Once the deep learning model converges, then the trained deep learning model is obtained in example implementations.

In example implementations, the state of the factory process involves a machine state and a job queue state, the machine state indicative of whether a machine associated with the factory process is allocated or idle at each predetermined time slot, the job queue state indicative of characteristics of jobs waiting to be processed in job slots or in backlog as illustrated in FIG. 2. As shown in FIG. 2, wherein the state of the factory process can be represented in a 2-D matrix involving the machine state and the job queue state, wherein the job queue state involves job due time and completion time represented in arrays, and processor(s) 710 can be configured to determine the lateness and tardiness based on a function of the processing time and the slack time as described with respect to FIG. 2.

In example implementations, processor(s) 710 can be configured to transfer the deep learning model from the factory to another factory, the transferring involving computing a projection function between the factory and the another factory; generating source state trajectories based on optimal policy of the factory determined form the trained deep learning model; converting the source state trajectories into target state trajectories; and executing a recovery process to determine the deep learning model for the another factory from the target state trajectories as illustrated in FIG. 3 and FIG. 6. Once obtained, processor(s) 710 can then apply the deep learning model to provide instructions to the other factory and control the processes of the other factory as illustrated in FIGS. 5 and 6.

In example implementations, processor(s) 710 can be configured to execute the recovery process by computing action trajectories for the another factory, and training the deep learning model through use of the target state trajectories as an input and the action trajectories as output class labels as illustrated in FIG. 4.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   generating a trained deep learning model configured to provide instructions to a factory process of a factory, the generating comprising:
   obtaining parameters from the factory process to derive a state of the factory process, the parameters comprising slack time;
   determining instructions for the factory process based on applying a deep learning model on the factory process trained against lateness and tardiness;
   providing instructions to the factory process for execution at the factory;
   obtaining state transitions of the state from updated parameters of the factory process including completion time as received from the factory;
   calculating a reward for the instructions provided to update the deep learning model, the reward based on deriving lateness and tardiness from predetermined job due and the completion time; and
   transferring the deep learning model from the factory to another factory to optimize dispatching process, the transferring comprising:
   generating random source states associated with the factory;
   generating random target states associate with the another factory;
   computing a projection function between the factory and the another factory based on the random source states and the random target states;
   generating source state trajectories based on optimal policy of the factory determined from the trained deep learning model;
   converting the source state trajectories into target state trajectories;
   executing a recovery process to determine the deep learning model for the another factory from the target state trajectories; and
   applying the deep learning model to provide instructions to the another factory,
   wherein the reward is calculated by dividing the derived lateness and tardiness over the completion time.

2. The method of claim 1, wherein the determining instructions for the factory process, providing instructions to the factory process for execution at the factory, obtaining state transitions from updated parameters of the factory process as received from the factory, and calculating a reward for the instructions provided to update the deep learning model are conducted in order and repeated until the deep learning model converges as the trained deep learning model.

3. The method of claim 1, wherein the state of the factory process comprises a machine state and a job queue state, the machine state indicative of whether a machine associated with the factory process is allocated or idle at each predetermined timeslot, the job queue state indicative of characteristics of jobs waiting to be processed in job slots or in backlog.

4. The method of claim 3, wherein the state of the factory process is represented in a 2-D matrix involving the machine state and the job queue state, wherein the job queue state comprises processing time and the slack time represented in arrays, wherein the method further comprises determining the lateness and tardiness based on a function of the job due time and completion time.

5. The method of claim 1, the recovery process comprising:
   computing action trajectories for the another factory, and
   training the deep learning model through use of the target state trajectories as an input and the action trajectories as output class labels.

6. A non-transitory computer readable medium, storing instructions for executing a process, the instructions comprising:
   generating a trained deep learning model configured to provide instructions to a factory process of a factory, the generating comprising:
   obtaining parameters from the factory process to derive a state of the factory process, the parameters comprising slack time;
   determining instructions for the factory process based on applying a deep learning model on the factory process trained against lateness and tardiness;
   providing instructions to the factory process for execution at the factory;
   obtaining state transitions of the state from updated parameters of the factory process including completion time as received from the factory;
   calculating a reward for the instructions provided to update the deep learning model, the reward based on deriving lateness and tardiness from predetermined job due and the completion time; and
   transferring the deep learning model from the factory to another factory to optimize dispatching process, the transferring comprising:
   generating random source states associated with the factory;
   generating random target states associate with the another factory;
   computing a projection function between the factory and the another factory based on the random source states and the random target states;

generating source state trajectories based on optimal policy of the factory determined from the trained deep learning model;

converting the source state trajectories into target state trajectories;

executing a recovery process to determine the deep learning model for the another factory from the target state trajectories; and applying the deep learning model to provide instructions to the another factory, wherein the reward is calculated by dividing the derived lateness and tardiness over the completion time.

7. The non-transitory computer readable medium of claim 6, wherein the determining instructions for the factory process, providing instructions to the factory process for execution at the factory, obtaining state transitions from updated parameters of the factory process as received from the factory, and calculating a reward for the instructions provided to update the deep learning model are conducted in order and repeated until the deep learning model converges as the trained deep learning model.

8. The non-transitory computer readable medium of claim 6, wherein the state of the factory process comprises a machine state and a job queue state, the machine state indicative of whether a machine associated with the factory process is allocated or idle, the job queue state indicative of whether a job associated with the machine is being executed or in a backlog.

9. The non-transitory computer readable medium of claim 8, wherein the state of the factory process is represented in a 2-D matrix involving the machine state and the job queue state, wherein the job queue state comprises processing time and the slack time represented in arrays, wherein the method further comprises determining the lateness and tardiness based on a function of the processing time and the slack time.

10. The non-transitory computer readable medium of claim 6, the recovery process comprising:
computing action trajectories for the another factory, and
training the deep learning model through use of the target state trajectories as an input and the action trajectories as output class labels.

11. An apparatus configured to control a factory process of a factory through instructions, the apparatus comprising:
a memory configured to store a trained deep learning model; and
a processor, configured to:
generate the trained deep learning model configured to provide the instructions, by:
obtaining parameters from the factory process to derive a state of the factory process, the parameters comprising slack time;
determining instructions for the factory process based on applying a deep learning model on the factory process trained against lateness and tardiness;
providing instructions to the factory process for execution at the factory;
obtaining state transitions of the state from updated parameters of the factory process including completion time as received from the factory;
calculating a reward for the instructions provided to update the deep learning model, the reward based on deriving lateness and tardiness from predetermined job due and the completion time; and
transferring the deep learning model from the factory to another factory to optimize dispatching process, the transferring comprising:
generating random source states associated with the factory;
generating random target states associate with the another factory;
computing a projection function between the factory and the another factory based on the random source states and the random target states;
generating source state trajectories based on optimal policy of the factory determined from the trained deep learning model;
converting the source state trajectories into target state trajectories;
executing a recovery process to determine the deep learning model for the another factory from the target state trajectories; and
applying the deep learning model to provide instructions to the another factory,
wherein the reward is calculated by dividing the derived lateness and tardiness over the completion time.

12. The apparatus of claim 11, wherein the processor is configured to conduct the determining instructions for the factory process, providing instructions to the factory process for execution at the factory, obtaining state transitions from updated parameters of the factory process as received from the factory, and calculating a reward for the instructions provided to update the deep learning model in order repeatedly until the deep learning model converges as the trained deep learning model.

13. The apparatus of claim 11, wherein the state of the factory process comprises a machine state and a job queue state, the machine state indicative of whether a machine associated with the factory process is allocated or idle, the job queue state indicative of characteristics of jobs waiting to be processed in job slots or in backlog.

14. The apparatus of claim 13, wherein the state of the factory process is represented in a 2-D matrix involving the machine state and the job queue state, wherein the job queue state comprises processing time and the slack time represented in arrays, wherein the method further comprises determining the lateness and tardiness based on a function of the job due time and completion time.

15. The apparatus of claim 11, the recovery process comprising:
computing action trajectories for the another factory, and
training the deep learning model through use of the target state trajectories as an input and the action trajectories as output class labels.

* * * * *